Patented June 23, 1942

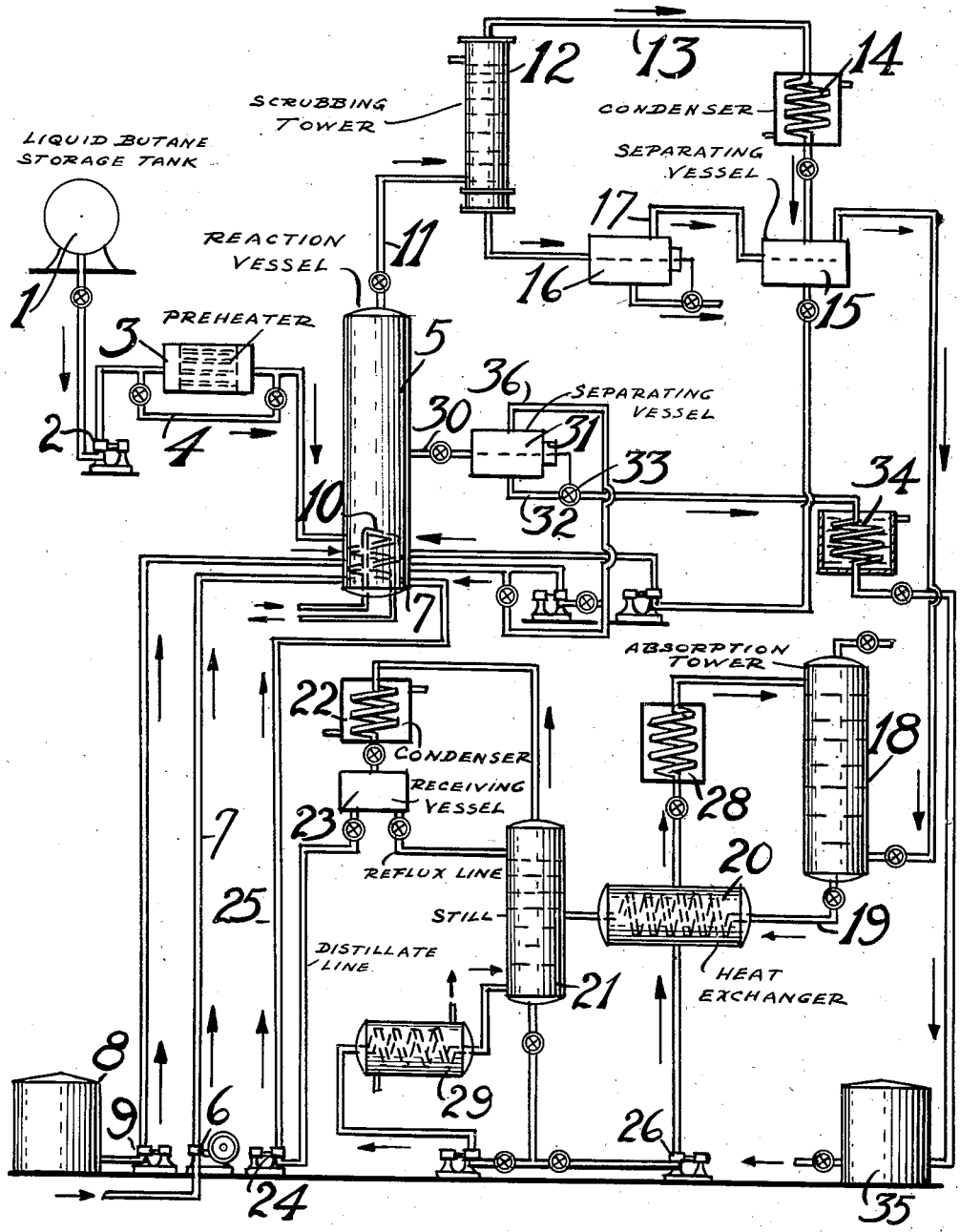

2,287,125

UNITED STATES PATENT OFFICE 2,287,125

OXIDATION OF LOW MOLECULAR WEIGHT HYDROCARBONS IN LIQUID PHASE AND CATALYST THEREFOR

John J. Owen and Paul T. Parker, Baton Rouge, La., assignors to Standard Oil Development Company, a corporation of Delaware Application October 12, 1938, Serial No. 234,540

8 Claims. (Cl. 260—451)

This invention relates to the art of oxidizing organic materials, and more particularly to the formation of valuable organic oxygen-containing compounds by oxidation of low molecular weight organic compounds, particularly of non-aromatic hydrocarbons, in liquid phase and to the use of improved oxidation catalysts in such processes.

The oxidation of normally gaseous paraffins, such as propane, butane, and pentane, and of the low molecular weight normally liquid hydrocarbons, such as the hexanes and heptanes, has previously been carried out with air or other oxygen-containing gases, principally at high temperatures due to the refractory nature of these hydrocarbons. These high temperatures are above the critical temperatures of the hydrocarbons and necessitate the carrying out of the oxidation in the vapor phase with resulting difficulties in control of the temperature, rate, and course of the reaction and with the hazards accompanying such difficult control. Methods have recently been devised for the oxidation of such hydrocarbons in liquid phase at temperatures below the critical temperature of the hydrocarbons with the production of valuable materials, such as acetic and propionic acids, esters of such acids, various ketones, aldehydes, alcohols, and the like.

These processes are carried out at considerably lower temperatures than those used in vapor phase oxidation. They possess substantial advantages over vapor phase oxidation in that the oxidation conditions are subject to much better control. The oxidation temperature is readily controlled, as the problem of removing large quantities of heat from the points of reaction necessary in vapor phase operation is not a factor in the liquid phase process. Also, the greater accuracy of temperature control permits a better control of the course of the oxidation and of the type and distribution of the oxidation products. There is less tendency toward the thermal decomposition and the further oxidation of the first products of the liquid phase oxidation, thus resulting in a greater proportion of higher boiling and more valuable oxidation products.

An improved class of catalysts has now been found by which this liquid phase oxidation can be carried out particularly effectively. These catalysts are metal salts or soaps of low molecular weight fatty acids containing preferably less than about 8 carbon atoms per molecule. The metals in these soaps consist of the alkali and alkaline earth metals, silver, copper, gold, mercury, tin, lead, titanium, zirconium, vanadium, columbium, tantalum, tungsten, molybdenum, uranium, chromium, manganese, iron, cobalt, and nickel. The fatty acids include formic, acetic, propionic, butyric, valeric, and higher fatty acids containing up to about 7 carbon atoms per molecule in an alkyl radical which may be normal, iso, or cyclo, and primary, secondary, or tertiary in structure. These soaps may be used singly or in admixture with each other. They possess the advantage over inorganic oxidation catalysts and over soaps of higher organic acids in that they are soluble in the low molecular weight hydrocarbons being subjected to oxidation. Their use in the oxidation of such low molecular weight hydrocarbons greatly simplifies the process and results in an increase in yield and quality of the oxidation products.

The following example is presented to illustrate suitable methods for carrying out the process of the present invention:

0.45 g. of manganese butyrate and 262 g. of liquid n-butane were placed in an autoclave which was previously flushed with nitrogen. An oxidizing gas mixture containing 6% oxygen and 94% nitrogen was then forced into the autoclave at a pressure of 1,000#/sq. in. The autoclave was sealed and then rocked at room temperature for several minutes to assure complete equilibrium, was heated to 300° F. for 10 minutes to start the reaction, and was then held at 290° F. for about 6 hours. A sample of gas taken from the autoclave at the end of this period contained 0.4% $CO_2$ and 0.0% oxygen. The autoclave was then cooled to room temperature and the pressure was reduced to 400#/sq. in. by release of gas. Fresh oxidizing was then forced in until the pressure was raised again to 1,000#/sq. in. The gaseous phase in the autoclave at that time contained 2.2% oxygen and 0.2% $CO_2$. The autoclave was again heated and was held at a temperature of 275 to 280° C. for 2¾ hours. At the end of this time a sample of gas withdrawn from the autoclave contained 0.0% oxygen and 0.6% $CO_2$. The cooling, reduction in pressure, and repressuring with additional oxidizing gas was repeated as before and the autoclave was then heated for 3 hours at 260° F. The oxygen content of the gas in the autoclave decreased from 2.9 to 1.3% during this period, while the carbon dioxide content increased from 0.2 to 0.5%, indicating substantial reaction occurred even at 260° F.

At the completion of this run the autoclave was allowed to cool and the pressure released.

The products of the reaction were washed from the bomb with the residual butane and the butane allowed to evaporate. The colorless liquid remaining after the evaporation of the butane weighed 8.3 g. and had an acid number of 336.

The product was then analyzed for acids, alcohols, and ketones. About ⅓ of the products was acidic, principally acetic acid with small amounts of other fatty acids. Alcohols were present in small amount and the remainder consisted mostly of ketones, methyl ethyl ketone being present in the largest amount.

While the above example described a batch process, it is recognized that larger scale operations are preferably conducted in a continuous or semi-continuous manner. In the latter case the oxidizing gas may be forced continuously through a heated reaction chamber containing the liquid hydrocarbon and catalyst until oxidation of the liquid has proceeded to the desired extent; for example, to an unsaponifiable content of about 50 to 70% or to an acid number of about 300 to 500. The gases leaving the reactor are preferably treated to separate therefrom any vapors and entrained liquids of the hydrocarbons undergoing oxidation or their oxidation products. These may be separated from the gases by cooling and further amounts may be recovered by scrubbing the cooled gases with suitable absorption materials, such as an absorption oil or "straw oil." These recovered materials may be suitably returned to the reaction vessel with or without separation of oxidized products before their return.

The reaction may also be conducted in a wholly continuous manner in the process described below in connection with the accompanying drawing which is a diagrammatic view in sectional elevation of a suitable apparatus for carrying out the process, and which indicates the flow of materials therethrough.

Referring to the drawing in greater detail, the material to be oxidized, which will be described as butane for the purpose of this illustration, is withdrawn from storage tank 1 and is forced by pump 2 through preheater 3, or by-pass 4, into the reaction vessel 5, at a pressure sufficient to maintain the charge in liquid phase at the reaction temperature. This pressure is usually above the critical pressure of the hydrocarbon used and is preferably considerably higher. Pressures above about 50 atmospheres are preferred with n-butane, for example, and pressures of 100 to 200 atmospheres and even much higher may be used. The reaction vessel 5 is in the form of a narrow vertical cylinder and is suitably constructed to withstand the temperature and the pressure used and the corrosive nature of the reaction products. It may, for example, be constructed of or lined with an alloy steel containing nickel, chromium, and molybdenum, combined in proportions suitable for resisting corrosion by weak organic acids.

A suitable oxidizing gas containing free oxygen, such as air, which may be diluted with additional nitrogen or other inert gases, is forced by compressor 6 through pipe 7 into contact with the materials to be oxidized. The pipe 7 is preferably supplied with suitable means for providing intimate contact of the oxidizing gas with the liquid hydrocarbons, such as narrow jets, diffusion thimbles, stirring devices, and the like. If solid catalysts in lump form are used, they may be packed in the reaction vessel 5 before the start of the process. Liquid catalysts and solutions of catalysts may be withdrawn from vessel 8 and forced by pump 9 into the reaction vessel 5. This reaction vessel may be insulated to prevent loss of heat and is preferably equipped with an interior coil 10 through which a heating medium such as steam or a cooling fluid such as water, may be circulated for temperature control.

During operation the oxidizing gases pass upwardly through the liquid hydrocarbons, the gas disengages from the liquid in the upper portion of this vessel and passes out at the top through line 11 into a scrubbing tower 12, where it is scrubbed with an aqueous lime slurry to remove corrosive constituents such as entrained acids. A second vessel may be placed in line 11 to provide additional time of contact of the oxidizing gases with entrained liquids and vapors carried out of the reaction vessel 5. Such second vessel is preferably maintained at about the same temperature as the reaction vessel, although it may be at a higher or lower temperature if it is desired to complete the utilization of any remaining oxygen, or to condense a part of the vapors. The scrubbed gas then passes through line 13 and condenser 14 into separating vessel 15 where the condensate, principally unreacted butane, separates from the uncondensed gas. The spent lime slurry from the scrubbing tower 12 passes into a separating vessel 16 wherein any entrained organic material separates as an upper layer and is withdrawn by line 17 to the vessel 15.

The uncondensed gases leaving vessel 15 may then be subjected to any suitable treatment to recover therefrom the remaining hydrocarbon vapors. For example, this may be done by passing the uncondensed gas from vessel 15 through absorption tower 18 in which it is scrubbed countercurrently with a suitable absorber oil, such as light gas oil. The scrubbed gas leaving the top of the tower 18 may be used to dilute additional air and returned to the oxidation vessel 5. The resulting "fat oil" leaves the absorber by line 19 and is passed through heat exchanger 20 into a still 21 wherein the absorbed hydrocarbons, principally butane in this instance, are separated as distillate from the absorber oil. The distillate passes through condenser 22 into a receiving vessel 23 from which a portion may be returned as reflux to the still 21. The remaining distillate may then be returned to the reaction vessel 5 for further oxidation by means of pump 24 and line 25. The stripped or "lean oil" is withdrawn from the bottom of still 21 and is returned by pump 26 through heat exchanger 20 and cooler 28 to the top of absorber 18. The still 21 may be heated by recycling a part of the lean oil through a bottoms heater 29.

The oxidation products are withdrawn from the reaction vessel 5 through line 30 into a separating vessel 31 wherein a lower aqueous layer containing water formed in the reaction, as well as any added with the catalyst, separates from an upper layer consisting principally of butane. The oxidation products are largely soluble in the water layer and are withdrawn with it through line 32 and liquid level-control valve 33 through cooler 34 into vessel 35. The oxidation products are then separated from the water and catalyst by any suitable method. For example, the total aqueous solution may be distilled, recovering involatile catalyst compounds as residue. The distillate is then further worked up by suitable methods to separate the acids and other oxy-organic compounds to any desired degree of refinement.

The upper layer of butane in separator 31 is returned by line 36 to the reaction vessel 5.

Various modifications in the above-described process may be carried out within the spirit of this invention. For example, a number of reaction vessels may be used in place of the vessel 5, and such vessels may be conducted in series, with flow of both liquid and gas through all except the last vessel of the series, which may serve as a separator. In such case, suitable by-pass lines should be provided so that any desired vessel can be connected in or taken out of the line of flow.

While the apparatus illustrated has been described above in connection with its use in a continuous process, the process can also be carried out in batch in a similar apparatus. In such case the charge stock is held in the reaction vessel 5 until oxidation has been carried out to the desired extent whereupon the total charge is withdrawn from the reaction vessel and worked up to separate the oxidation products.

The oxidation process may also be conducted by passing a mixture of the liquid hydrocarbons, oxidation catalyst and oxidizing gas such as air, through a heated coil or other elongated reaction vessel maintained at suitable conditions of temperature and pressure, and then through a cooling coil. The liquid and condensable constituents in the cooled products leaving the coil are preferably recycled or passed with additional air through other heated coils.

While operating conditions of this process vary somewhat with different materials for oxidation, the reaction temperature will in each case be below the critical temperature of the material charged.

It has been observed that the liquid phase oxidation of gaseous hydrocarbons with the improved catalysts of this invention proceeds readily at temperatures well below the critical temperature of the hydrocarbon being oxidized. However, in many cases it has been found difficult to start the oxidation at such low temperatures, and it has been found in such cases that the oxidation may be readily started by heating to a higher temperature at which the reaction commences and thereafter cooling to the temperature desired for conducting the remainder of the process. In continuous processes this will be found necessary only at the beginning of the process, as a part of the oxidation products is preferably recycled with fresh hydrocarbon to the oxidation zone and serves to maintain the conditions at which the desired oxidation proceeds at low temperatures. Similarly, in batch operation, the charge to the oxidation vessel may contain a small portion of the oxidation products of a previous charge, the oxidation starting with such a mixed charge at a lower temperature than when only unoxidized hydrocarbons and fresh catalysts are used as the charge stock.

Other paraffins of about 3 to 8 carbon atoms, particularly n-butane and the pentanes, may also be oxidized in liquid phase in the above-described process. Mixtures of the paraffins, such as distillate fractions of petroleum, may be used in place of the pure compounds. While the corresponding olefins may also be oxidized in this manner, their presence is preferably avoided as these lead to the formation of explosive products.

Other gases containing free oxygen, such as air, or air diluted with inert gases to an oxygen concentration in the diluted gas of about 5 to 10%, may also be used in place of the oxygen-nitrogen mixture described in the above example.

This invention is not to be limited by any examples presented herewith, all such examples and explanatory matter being presented solely for purpose of illustration, but is limited only by the following claims, in which it is desired to claim all novelty insofar as the prior art permits.

We claim:

1. Process for preparing oxy-organic compounds comprising bringing a gas containing free oxygen into contact with a low molecular weight aliphatic hydrocarbon at a reaction temperature below the critical temperature of said hydrocarbon and under sufficient pressure to maintain it in liquid phase, in the presence of an oxidation catalyst comprising a salt of a fatty acid of less than about 6 carbon atoms per molecule.

2. Process for preparing oxy-organic compounds comprising bringing a gas containing free oxygen into contact with a paraffin having less than about 6 carbon atoms per molecule at a reaction temperature below the critical temperature of said paraffin and under sufficient pressure to maintain it in liquid phase, in the presence of an oxidation catalyst comprising a salt of a fatty acid having less than about 6 carbon atoms per molecule, and separating the resulting oxy-organic compounds from the reaction products.

3. Process according to claim 2 in which the said paraffin has from 3 to 5 carbon atoms per molecule.

4. Process according to claim 2 in which the said paraffin is butane.

5. Process according to claim 2 in which the said catalyst comprises a salt of a fatty acid having from 3 to 5 carbon atoms per molecule.

6. Process according to claim 2 in which the said catalyst is manganese butyrate.

7. Process for preparing oxy-organic compounds comprising bringing a gas containing 5 to 10% oxygen and the remainder nitrogen into contact with liquid n-butane at a temperature of about 260 to 300° F. and a pressure above about 50 atmospheres in the presence of an oxidation catalyst comprising a salt of a fatty acid having less than 6 carbon atoms per molecule and separating from the reaction mixture oxidation products containing fatty acids and ketones.

8. Process according to claim 7 in which the said catalyst is mangenese butyrate.

JOHN J. OWEN.
PAUL T. PARKER.